Feb. 17, 1942.  H. LIST  2,273,121
STROBOSCOPE
Filed July 7, 1938  2 Sheets-Sheet 1
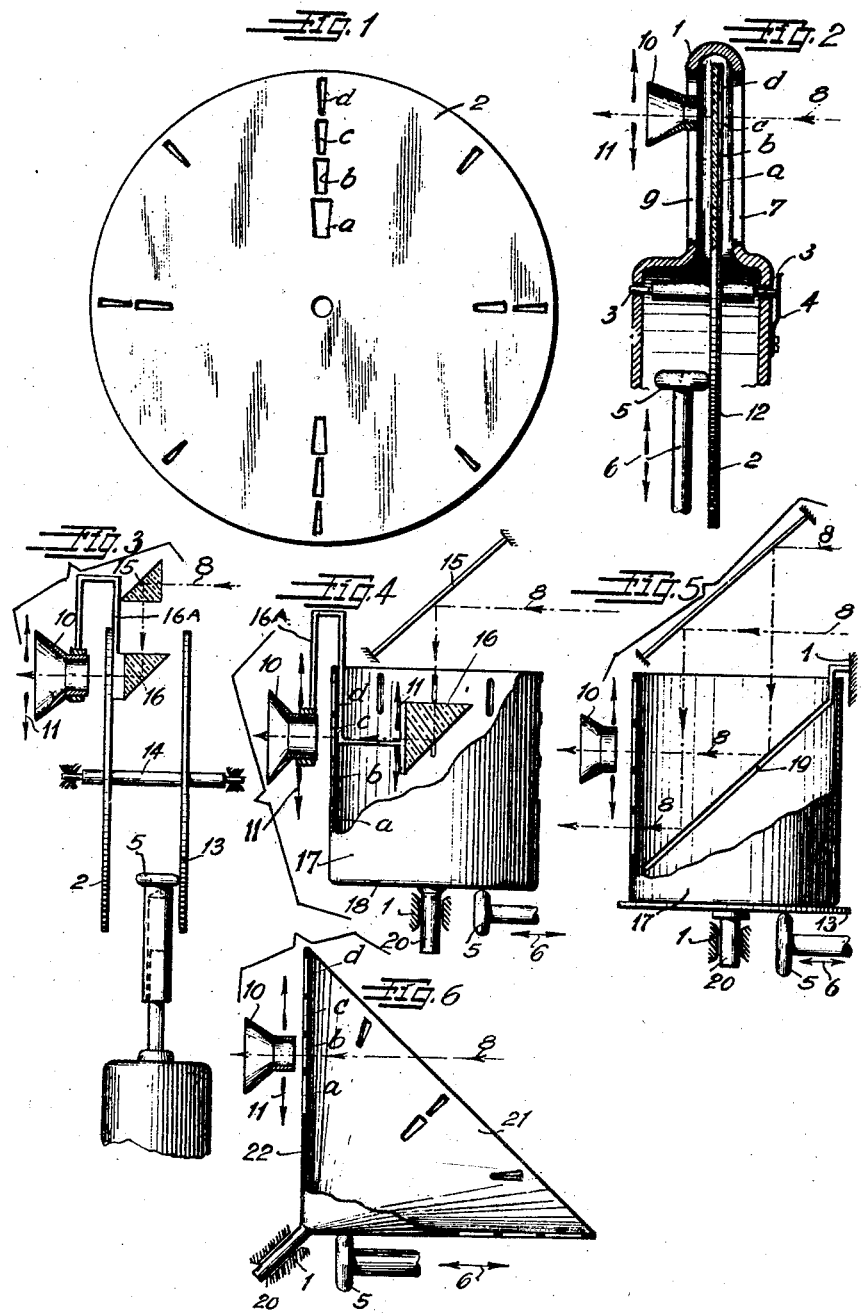
Inventor:
Heinrich List Feb. 17, 1942. H. LIST 2,273,121
STROBOSCOPE
Filed July 7, 1938 2 Sheets-Sheet 2
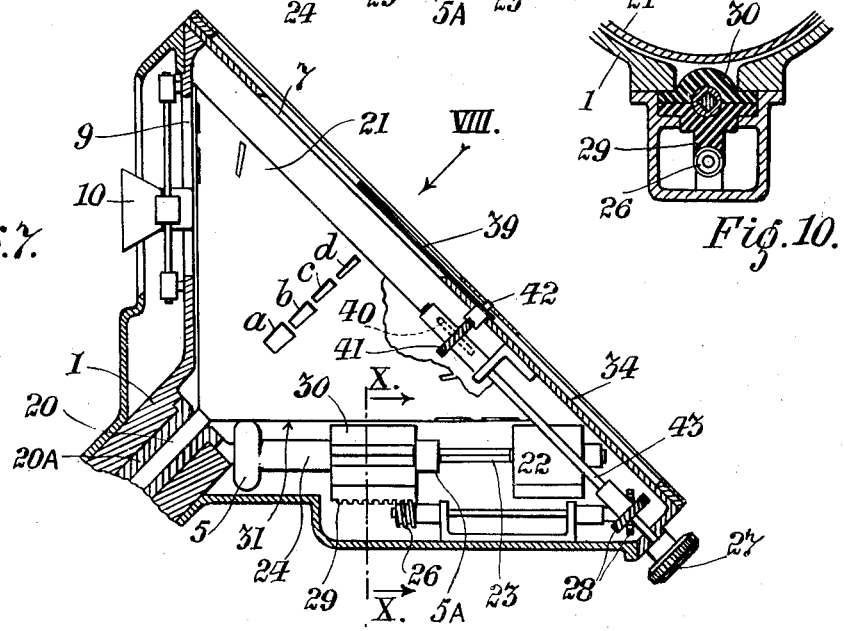
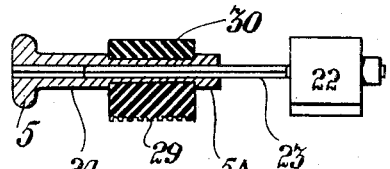
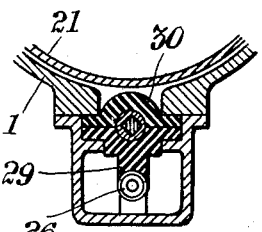
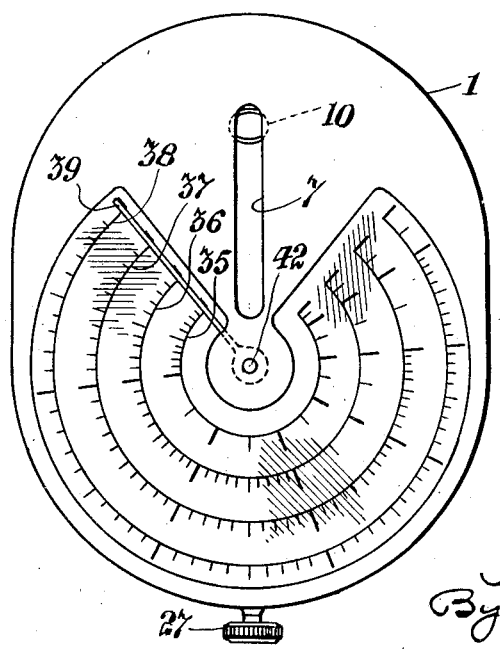
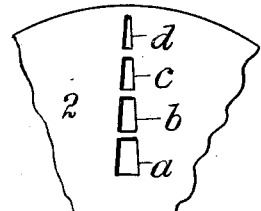
Inventor:
Heinrich List
By [signature]
Attorney Patented Feb. 17, 1942

2,273,121

UNITED STATES PATENT OFFICE 2,273,121

STROBOSCOPE

Heinrich List, Berlin-Lichterfelde, Germany

Application July 7, 1938, Serial No. 217,926
In Germany July 12, 1937

19 Claims. (Cl. 88—14)

This invention relates to stroboscopes having a rotary shutter, the speed of which is infinitely variable by means of a regulable drive. By "infinitely" variable is meant that the speed can be varied very smoothly—that is, by infinitely small increments—between determinate minimum and maximum limits.

An object of the invention is to provide a stroboscope which provides a plurality of measurement ranges and in which nevertheless there is no need to provide a plurality of interchangeable shutters for the respective ranges.

Another object of the invention is to provide a stroboscope having a rotary shutter in which are provided a plurality of separate groups of apertures, any of these groups being available for selection in accordance with the measurement range desired. Thus, the stroboscope dispenses with all need for providing a multi-apertured shutter with aperture-covering means and mechanism for adjusting said means so as to uncover, for the available measurement ranges, predetermined groups of apertures.

Another object of the invention is to provide a stroboscope with a shutter adapted for a plurality of measurement ranges and yet light in weight so that the shutter's moment of inertia will be small and wear will be minimized. Accordingly, sources of error due to wear phenomena can be practically eliminated.

Other objects of the invention will be apparent from the following specification and claims.

Embodiments of the invention are illustrated by way of example by the accompanying diagrammatic drawings, in which—

Figure 1 shows in elevation a rotating slotted shutter with its various groups of slits, and Fig. 1A is a fragmentary view showing a modified form of slits.

Fig. 2 shows partly in side elevation and partly in section a stroboscopic instrument embodying a rotating shutter such as shown in Fig. 1, parts of the instrument being omitted for the sake of clarity.

Fig. 3 shows in side elevation a further embodiment.

Figs. 4 and 5 show partly in side elevation and partly in section different embodiments including a drum-shaped rotary shutter and associated parts.

Fig. 6 shows partly in elevation and partly in section a rotary shutter of conical shape and associated parts.

Fig. 7 is a sectional elevation of a stroboscopic instrument incorporating the shutter and associated parts shown in Fig. 6, Fig. 7 being drawn to a larger scale than Fig. 6.

Fig. 8 is an elevation of the instrument shown in Fig. 7, the view being in the direction of arrow VIII of Fig. 7 and drawn to about the same scale as Fig. 7.

Fig. 9 is an axial section of shutter rotating parts shown in Fig. 7.

Fig. 10 is a cross section on line X—X of Fig. 7.

Throughout the various figures similar reference characters have been used to denote similar parts.

Referring to Figs. 1 and 2, in the housing 1 there is located the rotary shutter, which in the embodiment illustrated is in the form of a slotted disc 2, which is mounted on trunnions 3 in the housing 1. The trunnions 3 of the shutter 2 are axially displaceable, within narrow limits, in their bearings in the housing 1, by means of a spring 4 applying pressure on the adjacent trunnion, as shown in Fig. 2. The rotary shutter 2 is infinitely variable in speed with the aid of a per se known friction wheel drive. The driving pinion 5 of this drive is radially displaceable in the directions of the arrows 6, relatively to the centre of the shutter, for the purpose of providing the shutter with the requisite infinitely variable speed.

In the housing 1 there is provided an aperture 7 through which the light rays 8 from the object observed impinge on the shutter. Opposite the aperture 7 there is provided in the housing 1 a further aperture 9, in which the viewing eye-piece aperture 10 is disposed and is slidably adjustable in the directions of the arrows 11. The viewing aperture 10 is mounted in the housing 1 in such a way that the distance between the viewing aperture 10 and the rotating shutter is always small in order to provide a sharply defined view when making stroboscopic observations. With such a close arrangement of the viewing aperture 10 in front of the rotating shutter, it is also possible to permit a reduction of the size of the apertures in the shutter, as long as the angle of view is not impaired to any substantial extent. The rotary disc 2 is furnished with apertures in the form of slits, there being a plurality of separate groups of slits a, b, c and d. The viewing aperture is arranged very closely to these slits and is adapted to register the slits of any selected group in the rotation of the disc 2. For the purpose of registration with the aperture 10 the groups of slits are respectively arranged in circular series, the slits preferably increasing in number in proportion with their radial distance from the axis of the disc. The slits are arranged in a circular outer zone of the disc 2 and the pinion 5 is frictionally applied to the disc at an inner zone thereof.

The number of slits increases from stage to stage in accordance with some mathematical progression. In the example, the progression from stage to stage is geometrical, there being one slit $a$, two slits $b$, four slits $c$ and eight slits $d$. The progression however may be arithmetical or in accordance with some power.

It is desirable that, in order to obtain equal sharpness of delineation of the image in all ranges of measurement, the width of each slit should be inversely proportional to the number of the slits belonging to its group, and the sum of the widths of a group of slits should be directly proportional to the mean linear speed of these slits. That is to say, in the example illustrated by Fig. 1, supposing the slit $a$ and the slits $d$ had the same mean linear speed, as there is one slit $a$ and eight slits $d$, the former would be eight times as wide as each of the latter. But, in fact the slit $a$ does not have the same mean linear speed as the slits $d$, its speed being much less; therefore, the width of the slit $a$ should be proportionately less than eight times the width of each slit $d$. Otherwise stated, the breadth of the slits is dependent upon their own mean linear speed and the number of slits in their own group.

When designing shutters furnished with slits, it is naturally possible also to take into account the different sharpness of definition or delineation of the image within a slit length by providing the slits with sides widening towards the outer periphery, as shown best in Fig. 1, instead of parallel sides. In this way differences in definition, within one slit length, at the different linear velocities, can be removed. This influence, however, is generally not so considerable that any substantial disturbance to the viewing arises.

However, the formation of the slits, as Fig. 1A shows, may be such that they taper convergently (i. e. they narrow) considerably towards the outer periphery, so that it is possible to obtain within a slit length a sharper definition of the image with narrowing slit width. The disadvantage then arises that the brightness of the view decreases with the lessening of the slit width. On the other hand, the advantage of such a formation of the slits is that gradually varying sharpness is produced in the small extent of a slit length. In this way the observer is afforded alternative ways to view the most important part of the object under observation; that is, he can view the object under observation either with great brightness of view and consequently with a certain lack of sharpness or, with decreasing slit width, with a sacrifice of brightness of view but with greater sharpness of definition.

In the practical construction of such a shutter 2, the shutter structure may also act as a friction body forming a component of the friction drive, and it is necessary to make the shutter large enough in diameter to enable the desired groups of apertures to be accommodated on it. The shutter structure, as Fig. 2 shows, may be a composite body comprising a main structural portion made of transparent material, for example glass, on the side engaged by the driving pinion 5, and on the side remote from the driving pinion the various groups of slits are formed in opaque material, which material may be sprayed on the transparent material for example in the form of a deposit of colour or metal. It is also practicable to make these groups of slits in thin metal foil, which is subsequently secured by adhesion, in suitable manner, to the transparent material of the shutter 2. In Fig. 2 of the drawings, the groups of slits are made in metal foil 12, which is secured by adhesion on the rotating transparent disc 2.

Instead of making the rotating shutter of transparent material and utilising it at the same time as a friction body in the form of a friction disc, the friction body may as shown in Fig. 3 be made in the form of a friction disc 13 secured on the same shaft 14 as the shutter 2, which is made of opaque material with the requisite slits. In this embodiment, the friction body 13 can be made of opaque material.

In the embodiment according to Fig. 3, the object to be observed cannot be viewed directly through the shutter 2, because of the intervening disc 13. Accordingly the light rays 8 from the object to be viewed are deflected by way of reflectors 15 and 16, providing two changes of direction, into the viewing aperture 10. In an arrangement such as shown it is a practical essential that, on adjusting the viewing aperture 10 in accordance with the various measurement ranges defined by the respective groups of slits (such as $a$ to $d$ in Fig. 1) in the directions of the arrows 11, the deflecting means 16 at least must be positively adjusted in unison with the aperture 10. The deflecting means 16 is shown in a diagrammatic manner positively connected to the aperture 10 by a connector 16A. In an alternative arrangement, the deflecting means 16 can be made in the form of a reflecting surface of such a size and disposed at such an angle that the reflected light from the object to be viewed can be perceived through all the groups of slits, without having to displace the deflecting means 16 itself (see for example the reflector 19 shown in Fig. 5).

In the embodiment shown in Fig. 4, the shutter is in the form of a rotating drum 17 in the walls of which the various groups of slits $a \ldots d$ are provided. The base 18 of the drum is in the form of a friction surface to which infinitely variable speed is transmitted by the driving pinion 5, which is slidably adjustable in the directions of the arrows 6. The drum has a supporting spindle 20 journalled in a bearing forming a part of the housing 1. In such an arrangement of the shutter, a short and compact construction is obtained, which is specially advantageous, particularly for a portable instrument. As shown, the light rays from the object viewed are deflected into the viewing aperture 10 by means of reflectors 15 and 16 through the open interior of the drum. The reflector 16 must be adjustable in unison with the viewing aperture 10 in the directions of the arrows 11. The deflecting means 16 is shown in a diagrammatic manner positively connected to the aperture 10 by a connector 16A.

The need for adjustment of the reflector 16 can be dispensed with by employing an arrangement such as that shown in Fig. 5. In this embodiment, in the interior of the drum 17 there is a reflecting surface 19 secured stationarily on the housing 1, which reflecting surface is at the necessary angle of deflection and of such a size that, in every position of the viewing aperture 10, the light rays 8 from the object viewed are deflected through the corresponding group of slits into the viewing aperture. In this embodiment the base of the drum is not itself in the form of a friction surface, but on said base or apart from the same there is provided a friction disc 13 driven by the pinion 5.

The shutter may take the form of a conical shell, such as that shown in Fig. 6, the various groups of slits a . . . d being provided on the wall 21 of the cone. The wall sections cut by any axial plane of the cone form a right angle. The arrangement is such that one limiting wall section is parallel to the directions in which the viewing aperture 10 is adjustable, as indicated by arrows 11. The drive in this embodiment is applied to the side of the cone remote from the viewing aperture. The conical shutter 21 is mounted at its apex, being provided there with a spindle 20 journalled in a bearing 20A in the housing 1.

The means for rotating the conical shutter are shown in greater detail in Figs. 7 to 10. It is immaterial of what form the prime mover of the drive may be. In the example shown, the prime mover is a small constant speed electric motor 22 (conventionally represented), the motor being mounted in the housing 1. The motor shaft 23 is splined or polygonal in section and is slidably engaged by the shaft 24 of the driving pinion 5, the shaft 24 being bored to suit the shaft 23. Adjustment of the pinion 5 is effected by a worm 26 which is journalled in the housing 1, is turnable by a hand-knob 27 through intermeshing screw-gears 28 and is in mesh with a toothed rack 29 on the bearing 30 of the shaft 24. As Fig. 10 shows, the bearing 30 is slidably mounted in the housing 1. The arrangement is such that by appropriately turning the knob 27 the gear ratio of the drive is varied and the rotational speed of the shutter 21 increased or decreased as desired.

In the example, the conical shell of the shutter is of opaque material and presents at 31 a friction surface over the zone of driving engagement with the pinion 5.

It is important that the instrument should be provided with a large surface for scales indicative of speeds; and in this respect the conical-shutter construction is particularly advantageous, as it provides on both its front and rear sides adequate space for such a surface. In the example, the scales are provided on a plate 34 mounted at the rear of the stroboscope, the scales being arcuate and closely juxtaposed and being denoted by 35 to 38 (Fig. 8). These scales correspond to the settings of the movable eye-piece 10 in register with the groups of slits a to d respectively. A pointer 39 co-operating with the graduations of the four scales simultaneously is connected to the hand-knob 27 by intermeshing screw gears 40, 41 respectively on the arbor 42 of the pointer and the spindle 43 of the hand-knob. The arrangement is such that, when the knob 27 is turned to vary the speed of the conical shutter 21, the pointer 39 is automatically turned to indicate on the scales 35 to 38 graduations corresponding to multiples of the shutter speed, or other quantities proportionate thereto, as determined by the number of slits a to d in the corresponding groups. For example, scale a may indicate the speed of the shutter, scale b may indicate twice said speed, scale c may indicate four times said speed and scale d may indicate eight times said speed. It will be seen that the arcuate scales 35 to 38 extend over more than 180° and therefore give readings of great clarity. The different scales may be distinguished from one another by being given different colours.

It is immaterial by what means the scale pointer is operated provided that its angular setting is always in accurate agreement with the speed ratio setting of the driving pinion 5 in relation to the shutter.

In Fig. 7 the eye-piece is shown mounted for adjustment along a pair of guides (one only of said guides being shown, there being one at each side of the eye-piece).

To increase the frictional engagement between the pinion 5 and the driven surface 31 of the shutter provision may be made for magnetic attraction between these parts. Accordingly, the driven surface 31 may be presented by a conical shell of magnetic material namely soft iron, and the pinion 5 may be the pole of a magnet. In the example, the pinion 5 is represented as part of a permanent magnet, the one pole being the pinion 5 and the other pole being the opposite end 5A of the permanently magnetised hard steel body consisting of the end portions 5 and 5A and the intermediate shaft 24. The return path of the magnetic field from the pole 5A passes through air in order to obtain a high field density at the point of contact of the driving pinion 5 with the friction surface 31.

It will be seen that the conical-shutter arrangement is very compact and its components are easily accessible for inspection, attention or repair.

By providing a suitably large number of groups of slits, the range of infinitely variable regulation can be reduced within narrow limits so that as a rule the driving speed itself need be adjusted only within narrow limits.

The magnetic friction drive described with reference to the conical-shutter construction according to Figs. 6 to 10 is equally applicable to the other constructions described with reference to the other figures of the drawings.

I claim:

1. A stroboscope having a shutter mounted to rotate about an axis, adjustable means for rotating said shutter at infinitely variable speed, a hand-operable device for adjusting said shutter rotating means to vary the shutter speed, apertures in said shutter arranged in separate groups around said axis, different numbers of apertures constituting the respective groups, a viewing aperture which is adjustable into register with any of the plurality of groups of apertures, a plurality of juxtaposed speed-indicating scales, there being one of said scales for each of said groups of apertures and the respective scales being graduated to indicate products of the variable rotational speed of the shutter multiplied by the number of apertures in the related groups, a speed-indicating pointer co-operating with the several scales simultaneously, and means operatively connected to said hand-operable device and adapted to automatically move said pointer in agreement with any adjustment of said shutter rotating means.

2. A stoboscope having a drumform shutter mounted to rotate about its axis, means for rotating said shutter at variable speed, apertures in said drumform shutter circularly arranged in separate side-by-side axially spaced groups around the periphery thereof, different numbers of apertures constituting the respective groups, a viewing aperture which is adjustable in the direction of said axis into register with any of the plurality of groups of apertures, and reflecting means for directing light entering the drumform shutter through the shutter apertures and the viewing aperture, said reflecting means being disposed within the drumform shutter and being adjustable axially thereof from group to group of said apertures.

3. A stroboscope comprising a housing formed with aligned openings by virtue of which an operator can look through the housing, a shutter formed as a conical shell and mounted to rotate in said housing about the axis of conicity of said shutter, adjustable means for rotating said shutter at variable speed, means for adjusting said shutter rotating means, apertures in said shutter arranged in separate groups around said axis and adapted to move past a position of registration with said aligned openings, different numbers of apertures constituting the respective groups, and a viewing aperture which is adjustably mounted on said housing and in registration with one of said aligned openings for displacement in a path extending closely adjacent to said shutter so that the viewing aperture can be located close to and in register with any of the plurality of groups of apertures, a plurality of speed-indicating scales on said housing, there being one of said scales for each of said groups of apertures, a speed-indicating pointer mounted in said housing to co-operate with the several scales, and means operable by said adjusting means to move said pointer in agreement with the adjustment of said shutter-rotating means.

4. A stroboscope having a shutter mounted to rotate about an axis, a drive-receiving body rigid with said shutter and made of magnetic material, adjustable means for rotating said shutter at variable speed, said means comprising a rotary wheel engaging said body and forming a magnetic pole so as to press frictionally against said body under the force of magnetic attraction, means for adjusting said wheel to vary the shutter speed, apertures in said shutter arranged in separate groups around said axis, different members of apertures constituting the respective groups, a viewing aperture which is registrable with any of the plurality of groups of apertures, a plurality of juxtaposed speed-indicating scales, there being one of said scales for each of said groups of apertures and the respective scales being graduated to indicate products of the variable rotational speed of the shutter multiplied by the number of apertures in the related groups, a speed-indicating pointer co-operating with the several scales simultaneously, and means operable by said adjusting means to move said pointer in agreement with the adjustment of said wheel adjusting means.

5. A stroboscope having a shutter mounted to rotate about an axis, a friction surface in rigid relationship with said shutter, means for rotating said shutter, said means comprising a rotary friction pinion engaging said friction surface, means for adjusting said friction pinion radially of said axis to give a drive which is infinitely variable between upper and lower limits, apertures in said shutter arranged in separate groups around said axis, different numbers of apertures constituting the respective groups, a plurality of juxtaposed speed-indicating scales, there being one of said scales for each of said groups of apertures and the respective scales being graduated to indicate products of the variable rotational speed of the shutter multiplied by the number of apertures in the related groups, a speed-indicating pointer co-operating with the several scales simultaneously, means operable by said adjusting means to move said pointer in agreement with the adjustment of said friction pinion, and a viewing aperture which is adjustable into register with any of the plurality of groups of apertures.

6. A stroboscope comprising a housing, aligned openings in the housing walls, a shutter mounted to rotate about an axis in said housing, a frictional drive-receiving surface rigidly attached to said shutter, means for rotating said shutter, said means comprising a friction pinion engaging said surface and a rotary member to which pinion engaging said surface and a rotary member said pinion is fastened, said member and pinion being adjustably mounted in said housing for displacement relatively to said axis to give a variable drive, means of adjustment for displacing said member and pinion, apertures in said shutter arranged in separate groups around said axis so that all of said apertures move across said aligned openings in the rotation of said shutter, different numbers of apertures constituting the respective groups, a viewing aperture which is adjustably mounted on said housing for movement into registration with any selected one of said groups of apertures, a plurality of speed-indicating scales on said housing, there being one of said scales for each of said groups of apertures and the respective scales being graduated to indicate products of the variable rotational speed of the shutter multiplied by the number of apertures in the related groups, a speed-indicating pointer mounted in said housing to co-operate simultaneously with the several scales and means operatively connecting said pointer to said adjustment means and causing said pointer to turn to a position corresponding to the rotational speed of the shutter.

7. A stroboscope having a shutter mounted to rotate about an axis, a driver for rotating said shutter, means for adjusting said driver to vary the speed of the shutter, apertures in said shutter arranged in separate groups around said axis, different numbers of apertures constituting the respective groups, the width of the apertures of any inner group being greater than the width of the next outer group, the aperture widths being inversely proportional to the numbers of apertures in the group to which they belong and the sum of the widths of any of said groups of apertures being directly proportional to their own mean linear speeds a viewing aperture which is adjustable into register with any of the plurality of groups of apertures, a plurality of different speed-indicating scales corresponding to the respective groups of apertures and arranged in juxtaposition, a speed-indicating pointer co-operating with the several scales simultaneously, and an operative connection between said pointer and said driver-adjusting means causing said pointer to turn to a position corresponding to the rotational speed of the shutter.

8. A stroboscope having a shutter composed of a conical shell and mounted to rotate about the axis of the shell, means for rotating said shutter at variable speed, apertures in said shell arranged in separate groups around said axis at different distances from the apex of the shell, there being different numbers of said apertures in the respective groups to produce different optical effects when said shutter is rotated at any given speed, and a viewing aperture which is adjustable into register with any of the plurality of groups of apertures in a path parallel to the adjacent surface of the shell and to-and-from said apex.

9. A stroboscope having a shutter composed of a conical shell and mounted to rotate about the axis of the shell, said shell being opaque and presenting a conical frictional drive-receiving surface, means for rotating said shutter, said means comprising a rotary friction pinion engaging said surface, apertures in said shell arranged in separate groups around said axis, there being different numbers of said apertures in the respective groups to produce different optical effects when said shutter is rotated at any given speed, and a viewing aperture registrable with any of the plurality of groups of apertures, said friction pinion being adjustable to and from the apex of said shell to vary the speed thereof and said viewing aperture being adjustable to and from said apex from group to group.

10. A stroboscope having a shutter formed as an open-ended drum and mounted to rotate about its axis, means for rotating said shutter at variable speed, apertures in said shutter arranged in axially spaced groups around said axis, there being different numbers of apertures in the respective groups, a viewing aperture which is axially adjustable into register with any of the plurality of groups of apertures, and a reflector for directing light through the groups of apertures and the viewing aperture, said reflector being disposed within the drumform shutter and inclined to said axis so as to reflect light entering the open end of the shutter through said viewing aperture and the group of apertures registering therewith.

11. A stroboscope having a shutter mounted to rotate about an axis, a drive-receiving body rigid with said shutter and made of magnetic material, means for rotating said shutter at variable speed, said means comprising a rotary wheel engaging said body and forming a magnetic pole so as to press frictionally against said body under the force of magnetic attraction, adjustment means for effecting relative displacement between said wheel and body to vary the rotational speed of said shutter slits in said shutter arranged in radially spaced groups around said axis, the slit width of any inner group being greater than the slit width of the neighbouring outer group, the width of each slit being inversely proportional to the number of slits in its group and the sum of the widths of each of said groups of slits being directly proportional to the speed of said group of slits, a viewing aperture which is adjustable to register with any of the plurality of groups of slits a pointer, an operative connection between said pointer and said adjustment means causing said pointer to adopt a position dependent upon the speed of rotation of the shutter, and a plurality of speed-indicating scales set in juxtaposition, there being one of these scales for each of the groups of slits and said pointer cooperating with said scales simultaneously to indicate on each scale the product got by multiplying the rotational speed of the shutter by the number of slits in the respecive group.

12. A stroboscope having a shutter mounted to rotate about an axis, a drive-receiving body rigid with said shutter and made of magnetic material, means for rotating said shutter at variable speed, said means comprising a rotary wheel engaging said body and forming a magnetic pole so as to press frictionally against said body under the force of magnetic attraction, radially tapering slits in said shutter arranged in radially spaced groups around said axis, in any two of said groups the outer group having more slits than the inner and having slits of lesser average width than the inner, and a viewing aperture which is adjustable to register with any of the plurality of groups of slits.

13. A stroboscope as claimed in claim 12 in which the degree of taper of the respective slits is such that in any one slit length the width varies in direct proportion to the linear speed.

14. A stroboscope as claimed in claim 12, the width of each slit being inversely proportional to the number of the slits in its group and the sum of the widths of each of said groups of slits being directly proportional to the speed of said group of slits.

15. A stroboscope having a shutter composed of a conical shell and mounted to rotate about the axis of the shell, a drive-receiving body of magnetic material embodied in said shutter, means for rotating said shutter at variable speed, said means comprising a rotary wheel engaging said body and forming a magnet pole so as to press frictionally against said body under the force of magnetic attraction, apertures in said shell arranged in separate groups around said axis at different distances from the apex of the shell, there being different numbers of said apertures in the respective groups to produce different optical effects when said shutter is rotated at any given speed, and a viewing aperture which is adjustable into register with any of the plurality of groups of apertures in a path parallel to the adjacent surface of the shell and to-and-from said apex.

16. A stroboscope having a shutter composed of a conical shell and mounted to rotate about the axis of the shell, means for rotating said shutter at variable speed, slits in said shell arranged in separate groups around said axis at different distances from the apex of the shell, the slit width of any inner group being greater than the slit width of the neighbouring outer group, the width of each slit being inversely proportional to the number of the slits in its group and the sum of the widths of each of said groups of slits being directly proportional to the speed of said group of slits, and a viewing aperture which is adjustable into register with any of the plurality of groups of slits.

17. A stroboscope having a shutter composed of a conical shell and mounted to rotate about the axis of the shell, means for rotating said shutter at variable speed, longitudinally tapered slits in said shell arranged in separate groups around said axis at different distances from the apex of the shell, in any two of said groups the outer group having more slits than the inner and having slits of lesser average width than the inner and the relation between the numbers of slits in the different groups and the linear speeds of said slits being such that different groups of slits produce different optical effects when the shutter is rotated at any given speed, and a viewing aperture which is adjustable into register with any of the plurality of groups of slits.

18. A stroboscope as claimed in claim 17 in which the degree of taper of the respective slits is such that in any one slit length the width varies in direct proportion to the linear speed.

19. A stroboscope as claimed in claim 17, the width of each slit being inversely proportional to the number of the slits in its group and the sum of the widths of each of said groups of slits being directly proportional to the speed of said group of slits.

HEINRICH LIST.